C. CHINNOCK.

Injector for Insect-Powders.

No. 6,265. Reissued Feb. 2, 1875.

Witnesses:
James E. Chandler,
T. C. Smith

Inventor:
Chas Chinnock
per B. E. Valentine
Atty.

THE GRAPHIC CO. PHOTO-LITH. 39 & 41 PARK PLACE, N.Y.

UNITED STATES PATENT OFFICE.

CHARLES CHINNOCK, OF BROOKLYN, NEW YORK, ASSIGNOR, BY MESNE ASSIGNMENTS, TO CHARLES N. CRITTENTON, OF NEW YORK CITY.

IMPROVEMENT IN INJECTORS FOR INSECT-POWDER.

Specification forming part of Letters Patent No. 93,597, dated August 10, 1869; reissue No. 6,265, dated February 2, 1875; application filed December 22, 1874.

*To all whom it may concern:*

Be it known that heretofore one CHARLES CHINNOCK did invent a new and useful Improvement in Powder-Guns or Apparatus for Injecting Insect-Powder, of which the following is a full, clear, and exact description, reference being had to the accompanying drawing forming part of this specification, in which—

Figure 1:
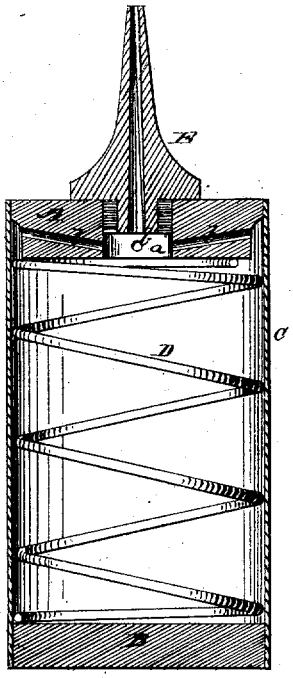
Figure 2:
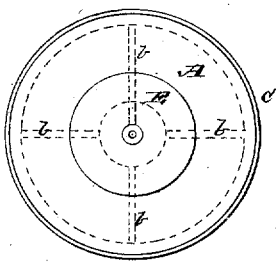

Figure 1 represents a longitudinal section of a powder-gun constructed in accordance with said invention. Fig. 2 is a front view of the same.

The said improvement relates to devices for injecting or scattering into the crevices or places which harbor obnoxious insects a powder for the extermination of such vermin.

The device used is as follows: Referring to the accompanying drawing, A and B represent stiff disks, made of wood or other suitable material. C is a close flexible jacket, made preferably of leather, arranged to connect the said disks, and retain the powder within. D is a spring, which is most useful when made in a spiral form. It is so arranged, in connection with the flexible jacket C, that it not only bears against the disks to keep them separated and secure distention of the case, but it can also serve to support the base and the sides of the jacket C. By this arrangement lateral distortion of the gun during its working can be prevented. The front of the gun has an aperture, *a*, made through it, to which is attached a nozzle or discharging-tube, E. This nozzle may be made removable, so as to allow the powder to be inserted through the aperture *a*, and radial air-passages *b*, extending from the periphery of the gun to the orifice *a*, will furnish air-vents to obviate the effect of clogging in the nozzle.

The method of operating the device is as follows: The nozzle E is removed and the gun is partially filled with the insect-destroying powder. The nozzle is then replaced. The orifice of the nozzle is then applied to the place in which it is desired to scatter the powder, which is accomplished by the quick pressure of the ends of the gun with the thumb and fingers.

If the powder clogs the orifice it may be relieved by shaking the same and allowing the air to be drawn in by the air-drafts *b*.

The said invention having thus been described, it is not desired to claim, broadly, all forms of bellows which can be used to scatter powder; but

What is claimed as the invention of said inventor is—

1. In a powder-injector, the combination of a flexible covering, C, with a distending-spring, D, substantially as and for the purpose described.

2. As a new article of manufacture, a powder-injector consisting of the combination of a removable nozzle, E, the air-passages *b*, flexible covering C, and spring D, substantially as and for the purposes described.

CHAS. N. CRITTENTON.

Witnesses:

F. W. HANAFORD,

H. ENTENSA.